US007349366B2

(12) United States Patent
de Heer et al.

(10) Patent No.: US 7,349,366 B2
(45) Date of Patent: Mar. 25, 2008

(54) OVERLAP MITIGATION IN WIRELESS LANS USING A CENTRAL MEDIUM ACCESS CONTROL

(75) Inventors: Arie Johannes de Heer, Twente (NL); Harold Wilhelm Teunissen, Overijssel (NL)

(73) Assignee: Lucent Technologies Inc., Murray Hill, NJ (US)

( * ) Notice: Subject to any disclaimer, the term of this patent is extended or adjusted under 35 U.S.C. 154(b) by 986 days.

(21) Appl. No.: 10/411,173

(22) Filed: Apr. 10, 2003

(65) Prior Publication Data

US 2003/0202498 A1    Oct. 30, 2003

(30) Foreign Application Priority Data

Apr. 10, 2002   (EP)   .................................. 02252555

(51) Int. Cl.
*H04Q 7/00*     (2006.01)
*H04B 7/00*     (2006.01)
*H04J 3/06*     (2006.01)

(52) U.S. Cl. ..................... 370/328; 370/337; 370/350; 455/41.2; 455/456.4; 455/502

(58) Field of Classification Search ................ 370/328, 370/337, 338, 345–350; 455/41.2, 446, 447, 455/448, 63.1, 68
See application file for complete search history.

(56) References Cited

U.S. PATENT DOCUMENTS 5,448,753 A * 9/1995 Ahl et al. ................. 455/422.1
6,081,718 A * 6/2000 Ando et al. ................ 455/447
6,546,254 B2 * 4/2003 Fitzgerald .................. 455/447
6,895,255 B1 * 5/2005 Bridgelall ................ 455/552.1
6,954,616 B2 * 10/2005 Liang et al. ............... 455/63.1
7,050,452 B2 * 5/2006 Sugar et al. ................ 370/465
7,065,373 B2 * 6/2006 Rodgers et al. ............ 455/502
2004/0120301 A1 * 6/2004 Kitchin ....................... 370/345

FOREIGN PATENT DOCUMENTS

WO    WO 02 06986 A2    1/2002

OTHER PUBLICATIONS

Chen K-C: "Medium Access Control of Wireless LANs for Mobile Computing" IEEE Network, IEEE Inc. New York, U.S. vol. 8, No. 5, Sep. 1994 pp. 50-63, XP000960856 ISSN: 0890-8044.

* cited by examiner

*Primary Examiner*—Duc M. Nguyen

(57) ABSTRACT

The present invention relates to an access point for a wireless local area network. The access point is arranged to service its stations by using a Point Coordination Function protocol and to monitor overlap with neighbouring access points. To mitigate overlap, the access point and overlapping neigbouring access points synchronize in such a way that the access point can service its stations in an overlap areas during a certain servicing time, while the overlapping neighbouring access points are silent, and vice versa. A silence trade-off mechanism is used to assure that overlapping access points get their fair share of available bandwidth.

6 Claims, 8 Drawing Sheets

Fig. 6(1)

| Iteration | (42) Determine Total Overlapping Period, Supply And Demand For Silence Per Neighbor | (43) Exchange Supply And Demands (Initially There Is Only Demand) | (44) Combine Demands | (45) TtoI Shared | (46) Minimal Supply And Demand | (47) Calculate Own Demand |
|---|---|---|---|---|---|---|
|   | TtoI$_A$=6: A[∞,φ], B[4,A], C[2,A] | TtoI$_B$=4: B[∞,φ], A[2,B], C[2,B]<br>TtoI$_C$=3: C[∞,φ], A[2,C], B[1,C] | A[2, BC],<br>B[4, AC],<br>C[2, AB] |   | A[2, BC],<br>B[4, AC],<br>C[2, AB] | A[1.3, BC],<br>B[1.3, AC],<br>C[1.3, AB] |
| 1 | TtoI$_B$=4: B[∞,φ], A[2,B], C[2,B] | TtoI$_A$=6: A[∞,φ], B[4,A], C[2,A]<br>TtoI$_C$=3: C[∞,φ], A[2,C], B[1,C] | A[2, BC],<br>B[4, AC],<br>C[2, AB] | 4 | A[2, BC],<br>B[4, AC],<br>C[2, AB] | A[1.3, BC],<br>B[1.3, AC],<br>C[1.3, AB] |
|   | TtoI$_C$=3: C[∞,φ], A[2,C], B[1,C] | TtoI$_A$=6: A[∞,φ], B[4,A], C[2,A]<br>TtoI$_B$=4: B[∞,φ], A[2,B], C[2,B] | A[2, BC],<br>B[4, AC],<br>C[2, AB] | 3 | A[2, BC],<br>B[3, AC],<br>C[2, AB] | A[1, BC],<br>B[1, AC],<br>C[1, AB] |
|   | TtoI$_A$=6: A[1.3, BC], B[4, A], C[2, A] | TtoI$_B$=4: B[1.3, AC], A[2, B], C[2, B]<br>TtoI$_C$=3: C[1, AB], A[2, C], B[1, C] | _* |   | A[1.3, BC],<br>B[1.3, AC],<br>C[1, AB] | A[1.7, BC],<br>B[1.3, AC],<br>C[1, AB] |
| 2 | TtoI$_B$=4: B[1.3, AC], A[2, B], C[2, B] | TtoI$_A$=6: A[1.3, BC], B[4, A], C[2, A]<br>TtoI$_C$=3: C[1, AB], A[2, C], B[1, C] |   |   | A[1.3, BC],<br>B[4, AC],<br>C[1, AB] | A[1.3, BC],<br>B[1.6, AC],<br>C[1, AB] |
|   | TtoI$_C$=3: C[1, AB], A[2, C], B[1, C] | TtoI$_A$=6: A[1.3, BC], B[4, A], C[2, A]<br>TtoI$_B$=4: B[1.3, AC], A[2, B], C[2, B] |   |   | A[1.3, BC],<br>B[1.3, AC],<br>C[2, AB] | A[1, BC],<br>B[1, AC],<br>C[1, AB] |

Fig. 6(2)

| Iteration | (42) Determine Total Overlapping Period, Supply And Demand For Silence Per Neighbor | (43) Exchange Supply And Demands (Initially There Is Only Demand) | (44) Combine Demands | (45) TtoI Shared | (46) Minimal Supply And Demand | (47) Calculate Own Demand |
|---|---|---|---|---|---|---|
| 3 | TtoI_B=6: A[1.6, BC], B[4, A], C[2, A] | TtoI_B=4: B[1.6, AC], A[2, B], C[2, B] TtoI_C=3: C[1, AB], A[2, C], B[1, C] | - | - | A[2, BC], B[1.6, AC], C[1, AB] | A[1.5, BC], B[1.5, AC], C[1, AB] |
|  | TtoI_B=4: B[1.6, AC], A[2, B], C[2, B] | TtoI_A=6: A[1.6, BC], B[4, A], C[2, A] TtoI_C=3: C[1, AB], A[2, C], B[1, C] | - | - | A[1.6, BC], B[4, AC], C[1, AB] | A[1.5, BC], B[1.5, AC], C[1, AB] |
|  | TtoI_C=3: C[1, AB], A[2, C], B[1, C] | TtoI_A=6: A[1.6, BC], B[4, A], C[2, A] TtoI_B=4: B[1.6, AC], A[2, B], C[2, B] | - | - | A[1.5, BC], B[1.5, AC], C[2, AB] | A[1, BC], B[1, AC], C[1, AB] |
| 4 | TtoI_A=6: A[1.5, BC], B[4, A], C[2, A] | TtoI_B=4: B[1.5, AC], A[2, B], C[2, B] TtoI_C=3: C[1, AB], A[2, C], B[1, C] | - | - | - | - |
|  | TtoI_B=4: B[1.5, AC], A[2, B], C[2, B] | TtoI_A=6: A[1.5, BC], B[4, A], C[2, A] TtoI_C=3: C[1, AB], A[2, C], B[1, C] | - | - | - | - |
|  | TtoI_C=3: C[1, AB], A[2, C], B[1, C] | TtoI_A=6: A[1.5, BC], B[4, A], C[2, A] TtoI_B=4: B[1.5, AC], A[2, B], C[2, B] | - | - | - | - |

\*) '-' Indicates No Change Since Last Iteration

OVERLAP MITIGATION IN WIRELESS LANS USING A CENTRAL MEDIUM ACCESS CONTROL

CROSS REFERENCE TO RELATED APPLICATION

This application claims priority of European Application No. 02252555.4 filed on Apr. 10, 2003.

FIELD OF THE INVENTION

The present invention relates to an access point for a wireless local area network. The invention also relates to a method to be carried out by such an access point, and to a computer program product to be loaded by such an access point.

BACKGROUND

Wireless Local Area Networks (WLANs) are generally implemented according to a standard as defined by the ISO/IEC 8802-11 international standard (IEEE 802.11). The 802.11 standard is a standard for wireless LAN systems that operate in the 2.4-2.5 GHz ISM (industrial, scientific and medical) band or 5 GHz U-NII band. It focuses on MAC (medium access control layer) and on PHY (physical layer) protocols for so-called access point based networks and ad-hoc networks.

In access point based networks, stations within a cell will communicate directly to their associated access point. The set of stations in a cell together with the access point is called a Basic Service Set (BSS). The access point (AP) forwards messages to destination stations within the same cell or through a wired distribution system to other access points, from which such messages arrive finally at a destination station. In ad-hoc networks, the stations communicate directly to each other and there is no access point or (wired) distribution system.

The 802.11 standard supports DSSS (direct sequence spread spectrum) with differential encoded BPSK and QPSK, FHSS (frequency hopping spread spectrum) with GFSK (Gaussian FSK), and infrared with PPM (pulse position modulation). These three PHYs (DSSS, FHSS and infrared) all provide bit rates of 2 and 1 Mbit/s. Furthermore, the 802.11 standard includes extensions called 11a and 11b. Extension 11b [2] is for a high rate CCK (Complementary Code Keying) PHY, providing bit rates 5.5 and 11 Mbit/s as well as the basic DSSS bit rates of 2 and 1 Mbit/s within the same 2.4-2.5 GHz ISM band. Extension 11a is for a high bit rate OFDM (Orthogonal Frequency Division Multiplexing modulation) PHY standard providing bit rates in the range of 6 to 54 Mbit/s in the 5 GHz band.

The 802.11 basic medium access behaviour allows interoperability between compatible PHYs through the use of the CSMA/CA (carrier sense multiple access with collision avoidance) known as Distributed Coordination Function (DCF) protocol and a random back-off time following a busy medium condition. In addition, all directed traffic uses immediate positive acknowledgement (ACK frame), where a retransmission is scheduled by the sender if no ACK is received. The 802.11 CSMA/CA protocol is designed to reduce the collision probability between multiple stations accessing the medium at the point in time where collisions would most likely occur. Collisions are most likely to occur just after the medium becomes free, following a busy medium. This is because multiple stations would have been waiting for the medium to become available again. Therefore, a random back-off arrangement is used to resolve medium contention conflicts. In addition, the 802.11 MAC defines special functional behaviour for fragmentation of packets, medium reservation via RTS/CTS (request-to-send/clear-to-send) polling interaction.

The 802.11 MAC also describes the way beacon frames are sent by the AP at regular (beacon) intervals to enable stations (STAs) to monitor the presence of APs. The 802.11 MAC also includes a set of management frames, which allow a STA to actively scan for other APs on any channel available. In 802.11 AP-based networks the STAs associate to an AP with a corresponding network name or BSS identifier, normally the STAs associate with best-received and nearest AP.

Another mode of operation of 802.11 is Point Coordination Function (PCF). In this mode the medium access control is centralized. During a beacon interval, a Basic Service Set (BSS) will by turns operate in DCF mode and PCF mode as is prescribed in the 802.11 standard. Where in DCF mode both the AP and the STAs have equal access opportunities, in PCF mode the AP controls the medium access by polling the STAs. When a STA is polled, the STA is allowed to access the medium to transmit a packet. Since the AP and STAs do not perform carrier sensing and collision avoidance in the PCF mode, this may lead to unsynchronized behaviour and interference with neighbouring APs. This is evidently the case if the neighbouring APs operate on the same frequency channel as the AP and if their cells overlap with the cell of the AP. These APs will be referred to as overlapping neighbouring APs. The overlapping neighbouring APs may continuously perform collision avoidance (since the medium seems constantly occupied), resulting in unfair spatial use. Furthermore, if two or more overlapping neighbouring APs operate in PCF mode, it may lead to uncoordinated interference and thus high packet loss probabilities, due to the absence of carrier sensing and collision avoidance before medium access. One of objects of the present invention is to mitigate overlap between overlapping neighbouring APs in order to avoid the problems mentioned above.

SUMMARY OF THE INVENTION

The object mentioned above will be realized by providing an access point for a wireless local area network, the access point being arranged to service at least one station by using a central medium access control protocol during a time period, and to monitor overlap with neighbouring access points, and to define one or more areas in which at least one first station experiences overlap, as being overlap areas, and one or more areas in which at least one second station does not experience overlap, as being non-overlap areas, and to define one or more neighbouring access points causing the overlap as being overlapping neighbouring access points, wherein the access point and the overlapping neighbouring access points synchronize in such a way that the access point can service the at least one first station in the overlap areas during a servicing time within the time period, while the overlapping neighbouring access points are silent, and vice versa, characterized in that the access point is further arranged to determine the amount of the servicing time by exchanging requests for silence with its overlapping neighbouring access points. Furthermore the present invention relates to an access point as described above, characterized in that the access point is arranged to execute a silence trade-off mechanism which includes:

(a) initialisation of an own supply for silence;

(b) determination of a total period of time available for resolving overlap;
(c) determination of an own demand for silence towards each overlapping neighbouring access point;
(d) exchanging of an amount of time which is available by the access point (1) for resolving overlap with its neighbouring access points (2, 3);
(e) combination of coincident demands using a predetermined combination rule;
(f) determination of an effective overlapping time according to a predetermined overlap time rule;
(g) setting the own supply for silence to the effective overlapping time;
(h) determination of a minimum of demands and supplies for silence according to a minimum determination rule;
(i) calculation of the own supply of silence;
(j) repeat the previous steps until a predefined criteria is met.

The main advantage of this mechanism is that the overlapping APs get their fair share of the available bandwidth. If an AP needs less than its (equal) share of the available bandwidth, then the remaining bandwidth is shared among the remaining APs claiming time.

Moreover the present invention relates to a wireless local area network comprising at least two access points as described above.

Also, the invention relates to a method to be performed by an access point for a wireless local area network, the access point being arranged to service at least one station by using a central medium access controlprotocol during a time period, and to monitor overlap with neighbouring access points, and to define one or more areas in which at least one first stations experiences overlap, as being overlap areas, and one or more areas in which at least one second station does not experience overlap, as being non-overlap areas, and to define one or more neighbouring access points causing the overlap as being overlapping neighbouring access points, wherein the access point and the overlapping neighbouring access points synchronize in such a way that the access point can service the at least one first station in the overlap areas during a servicing time within the time period, while the overlapping neighbouring access points are silent, and vice versa, characterized by determination of the amount of the servicing time by exchanging requests for silence by the access point with its overlapping neighbouring access points.

Furthermore the invention relates to a computer program product to be loaded by an access point as described above, the computer program product providing the access point with the capacity for determining the amount of the servicing time by exchanging requests for silence by the access point with its overlapping neighbouring access points.

Finally the present invention relates to a data carrier provided with a computer program product as described above.

BRIEF DESCRIPTION OF THE DRAWINGS

Below, the invention will be explained with reference to some drawings, which are intended for illustration purposes only and not to limit the scope of protection as defined in the accompanying claims.

FIG. 6 is a table containing an example of the demands and supply for silence by three different APs.

DETAILED DESCRIPTION

Figure 1:
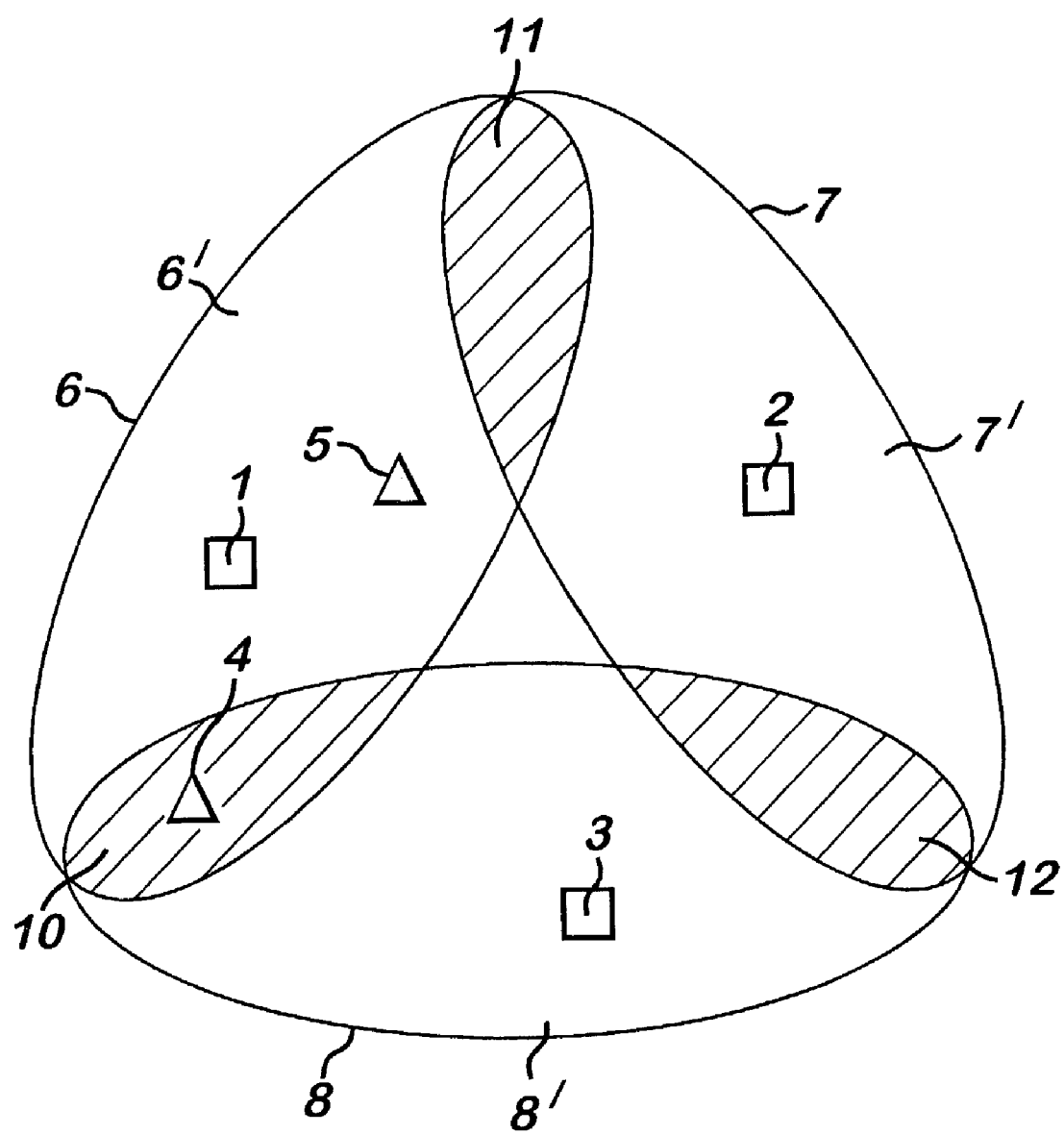
FIG. 1 shows three overlapping cells of a WLAN.

In FIG. 1 an example of a WLAN 1 is shown having three cells 6, 7, 8. Each cell 6, 7, 8 is serviced by an access point (AP). APs 1, 2 and 3 are servicing cells 6, 7 and 8 respectively. AP 1 is associated with STAs 4, 5. STA 4 is situated in an overlap area 10 which is the common of cell 6 and cell 8. In this overlap area STAs receive signals coming from both AP 1 and AP 3. These APs 1, 3 are using the same frequency which may cause interference problems and loss of data packets. In FIG. 1 two more overlap areas 11, 12 are shown. All three APs 1, 2, 3 are arranged to detect overlap. This may be done by, for example, detecting packet loss or detecting signals from STAs serviced by other access point. AP 1 is also servicing STA 5 which is situated in cell 6 but outside the overlap areas 10, 11. The detection of overlap is beyond the scope of the present invention, but is known to persons skilled in the art. The present invention is in no way restricted to a specific method of detecting overlap between neighbouring cells (i.e. APs).

If AP 1 detects overlap with one or more neighbouring APs, it starts an overlap mitigation mechanism. The key aspect of this mechanism is that the local (i.e. AP 1) and overlapping APs (i.e. AP 2, 3) synchronize such that the local AP can service the STAs in the overlap areas 10, 11 while the overlapping neighbouring APs are silent, and vice versa.

Figure 2:
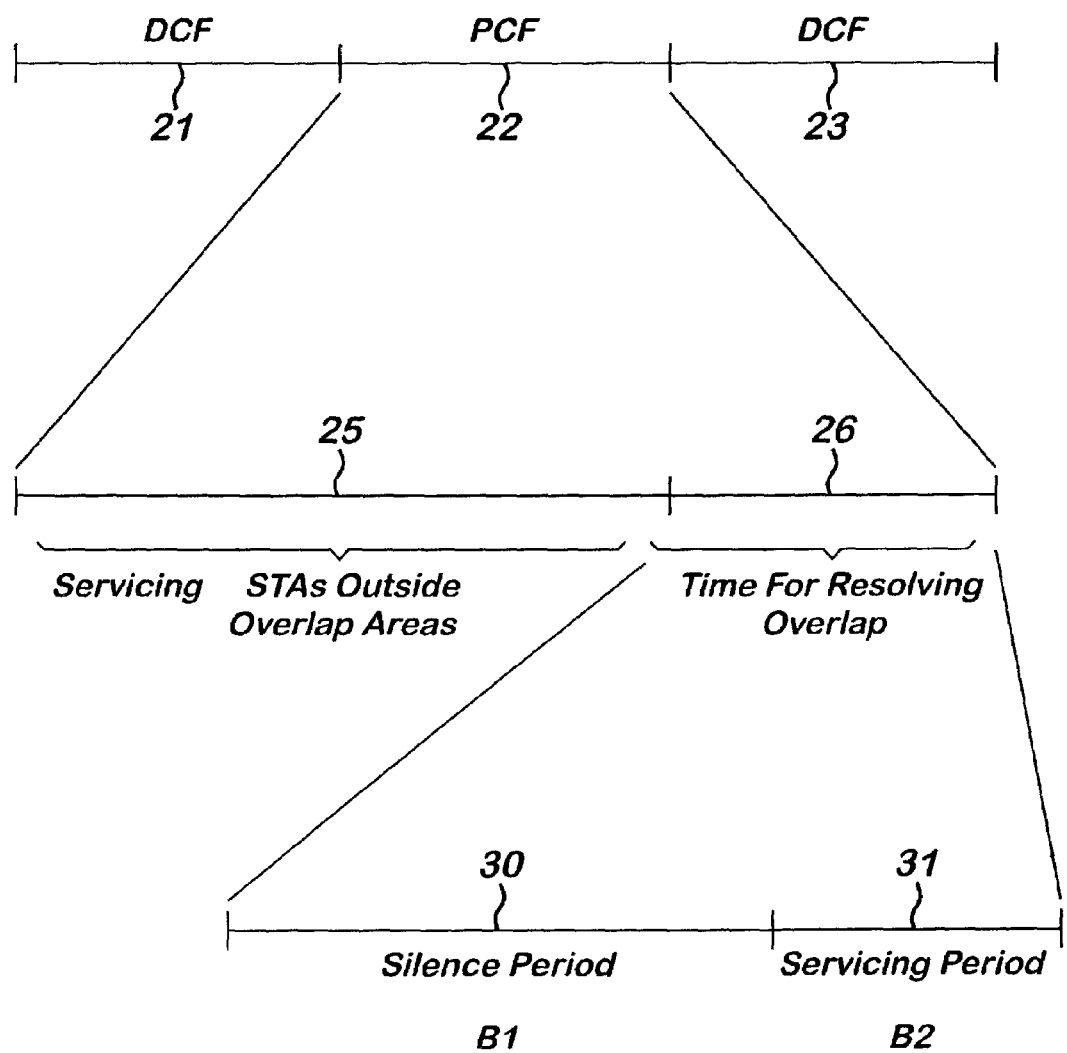
FIG. 2 shows the content of the different time periods within a PCF period.

FIG. 2 shows an example of a time schedule for communication of AP 1 with its STAs 4, 5. During a time frame 21, AP 1 is using the DCF protocol. Next, in a time frame 22, AP 1 is using the PCF protocol. Then, according to the 802.11 standard, AP 1 is using DCF again, see time frame 23. The time frame 22 is divided into a time period 25 for servicing STAs outside the overlap areas 10, 11, and into a time period 26 for servicing STAs within the overlap areas 10, 11. Preferably the length of the time frame 22 is the same for all APs.

In order to service STAs within the overlap areas 10, 11, the AP 1 demands a silence period from the overlapping neighbouring APs (i.e. AP 2, 3). The overlapping APs (i.e. AP 2, 3) are free to grant the demanded silence periods and could, for example, offer a smaller silence period than demanded by AP 1. If a particular silence period is supplied by AP 2, 3, then the demanding AP 1 can service for example the STAs within the overlapping areas 10, 11 in that specific period. On the other hand, the overlapping neighbouring APs will demand their share of silence from AP 1. Communication between the APs 1, 2, 3 for the silence trade-off, can for example be established by sending messages using working frequencies of the APs 1, 2, 3 and is outside the scope of the present invention, but is known to persons skilled in the art.

In FIG. 2, the time period 26 for servicing STAs in the overlap areas 10, 11, is divided in time periods 30 and 31. In time period 30 the AP 1 is silent, and in time period 31, the AP 1 is servicing STAs within the overlap areas 10, 11, (e.g. STA 4). The length of time periods 30 and 31 is a result of an overlap mitigation mechanism. In this mechanism the APs 1, 2, 3 are trading off their supply and demand for silence. The mechanism will be discussed with reference to FIGS. 3 and 4. It is noted that the time period 26 could also be divided into smaller periods 30, 31 where the time periods 30 and 31 alternate within the period 26.

Figure 3:
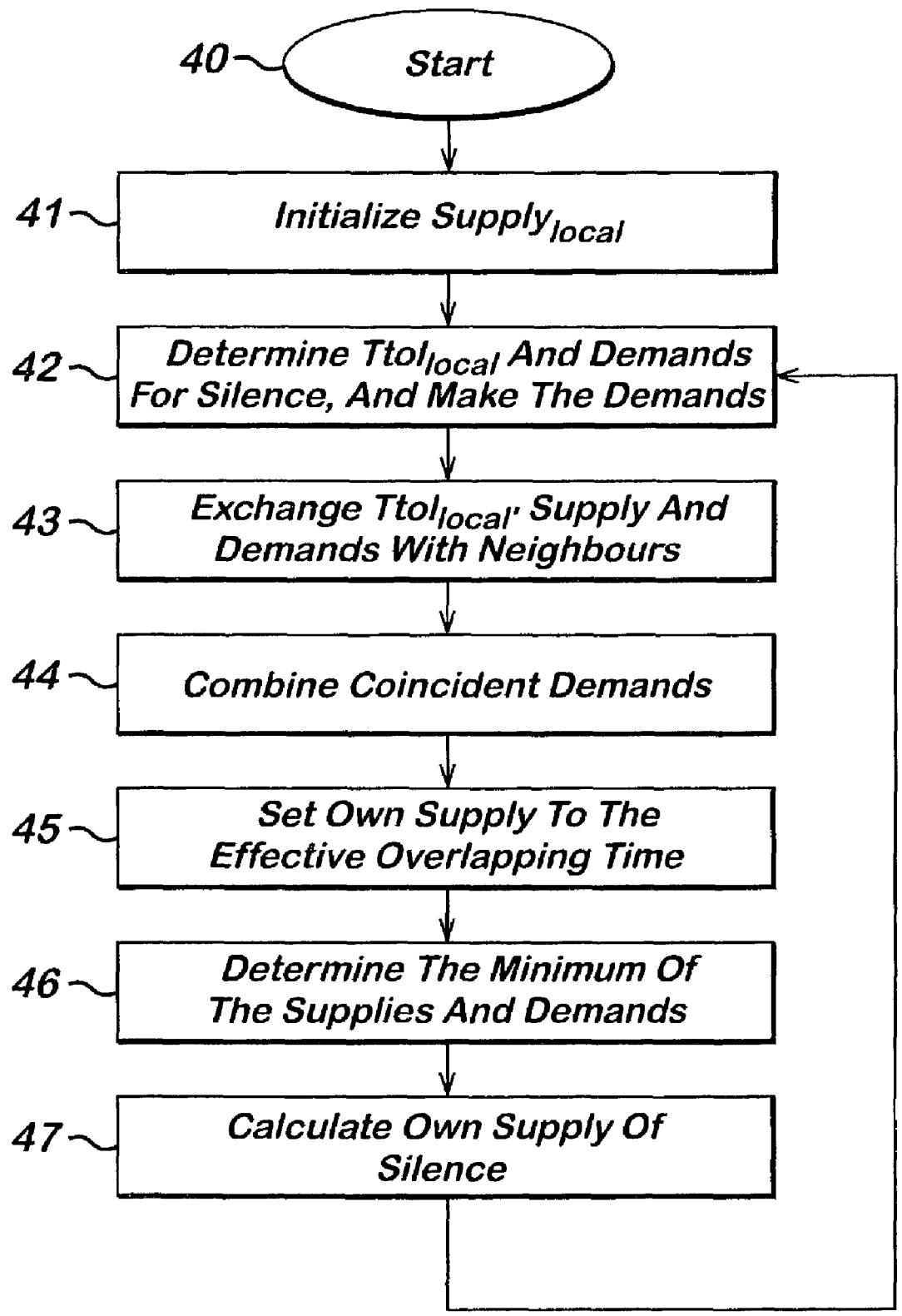
FIG. 3 shows a flow diagram depicting the steps of the overlap mitigation mechanism.

In FIG. 3 a flow diagram is shown of an embodiment of the present invention. In the FIG. 3, steps of a possible overlap mitigation mechanism are shown. In the description of the mechanism, certain symbols and formulas are used which will be explained hereafter. When executing the mechanism, each AP refers to itself as $AP_{local}$. A time period in which a $AP_{local}$ is available for resolving overlap is called $Ttol_{local}$. This $Ttol_{local}$ corresponds with time period 26 of FIG. 2. Only part of $Ttol_{local}$ will actually be used for resolving overlap. This part has to be shared by all APs which resolve overlap, and is called effective overlapping time $Tshared_{local}$. The index 'local' is used to indicate that each AP, although it is a shared parameter, calculates its own $Tshared_{local}$. The number of all APs demanding and supplying silence is called #AP. Now, the maximum period of $Tshared_{local}$ that can be claimed by a single AP, is equal to $Tshared_{local}$ divided by #AP and is called $Claim_{local}$.

Neighbouring APs, which have overlap with $AP_{local}$, are part of a set called neighbours (NBRS). So if $AP_{local}$ has detected overlap from j neighbouring APs, then NBRS={$N_1$, $N_2$, ... $N_j$}, with j being a positive integer.

If a set S of one or more APs is demanding $AP_{local}$ for a silence duration n, this is denoted as $AP_{local}[n, S]$.

If a set S of one or more APs is supplying a silence duration n to $AP_{local}$, this is denoted as $\underline{AP_{local}[n,S]}$.

The overlap mitigation mechanism starts with a step 40. Then, in a step 41, $AP_{local}$, initiates its own supply called $Supply_{local}$, which is set to $\underline{AP_{local}[\infty,\emptyset]}$. This means that an unknown (empty) set $\emptyset$ of APs wants to supply an unlimited ($\infty$) amount of silence to $AP_{local}$. Next, in a step 42, $Ttol_{local}$ is determined. This may be done by setting $Ttol_{local}$ equal to the PCF time period times the number of STAs experiencing overlap, divided by the total number of associated STAs. Also for each overlapping neighbouring AP $N_i$, the demand for silence is determined; i.e. $N_i$[demanded_silence, $AP_{local}$] with $N_i$ being a AP in the set NBRS. The demand for silence is dependent on the number of STAs in the overlap areas 10, 11 and/or is dependent on the load of the STAs. The demands for silence to all $N_i$ in NBRS are forming a set called Demands. This set is stored in memory by the AP of $AP_{local}$.

In a next step 43, $AP_{local}$ will exchange $Ttol_{local}$, $Supply_{local}$ and Demands with its overlapping neighbours $N_i$. As a result, the following information is available for $AP_{local}$:

A set $Ttols_{local}$ containing all the values of $Ttol_Y$ of the overlapping neighbours of the $AP_{local}$, $Ttols_{local}:=\{Ttol_Y|Y \in NBRS\}$;

A set Demands containing all the demands for silence of the overlapping neighbours and of the local AP, Demands:={X[demanding silence, Y]|Y$\in$NBRS $\vee$Y=$AP_{local}$} where X can be any AP unequal to AP Y;

A set $Supplies_{local}$ containing the supplies for silence of the overlapping neighbours of $AP_{local}$, i.e.

$Supplies_{local}:=\{\underline{Y[supplyingsilence,X]}|Y\in NBRS\}$ where X can be any AP unequal to AP Y.

In step 44, the coincident demands are combined to one demand, according to the rule:

K[n,X], K[m, Y], . . . →K[Max(n . . . m), XY . . . ]

with K, X and Y being APs and Max( ) being a function which calculates the maximum of its parameters, and where n and m are positive integers. This means that if two or more overlapping APs (e.g. X and Y) request silence from the same AP K, then these requests are combined and the demanded silence is set to the longest demand.

Then, in step 45, $AP_{local}$, calculates the effective overlapping time $Tshared_{local}$ by using the formula:

$Tshared_{local}:=Min(Ttol_{local}, Max(Ttols))$, where Min( ) and Max( ) are functions calculating the minimum and maximum of the parameters, respectively.

This means that the effective overlapping time is always the smallest of the local $Ttol_{local}$ and the longest Ttol of the overlapping neighbours (it makes no sense to offer a larger overlapping time than that the neighbours are requesting).

The calculated $Tshared_{local}$ is used by $AP_{local}$ to set its own supply to this effective overlapping time, using formula:

$Supply_{local}:=\underline{AP_{local}[Tshared_{local},\emptyset]}$

The overlap mitigation mechanism proceeds with a step 46 in which the minimum of the supplies and demands is determined according to the next formula:

∀ K[n,X]$\in$Demands DO n:=Min(n, m), m from $\underline{K[m,Y]}\in(Supplies_{local} \cup \{Supply_{local}\})$ where K, X and Y are APs, n and m are numerical values.

If necessary, the demands are limited by the corresponding supply, since it is not useful to demand more silence from an AP than there is supplied by that AP. This is why the minimum function Min( ) is used. The functioning of this formula will be made clearer with help of an example in FIG. 6.

Now, in a step 47, the $AP_{local}$ calculates its own supply of silence. This step is explained with help of FIG. 4 in which the different substeps are mentioned. After step 47, step 42 is executed again, followed by steps 43, 44, 45, 46 and 47. So, this means that a loop is formed. Preferably, this loop will be infinite. If no changes in demands and supplies of the different APs arise, the results of this loop will converge, as will be shown in an example below.

Figure 4:
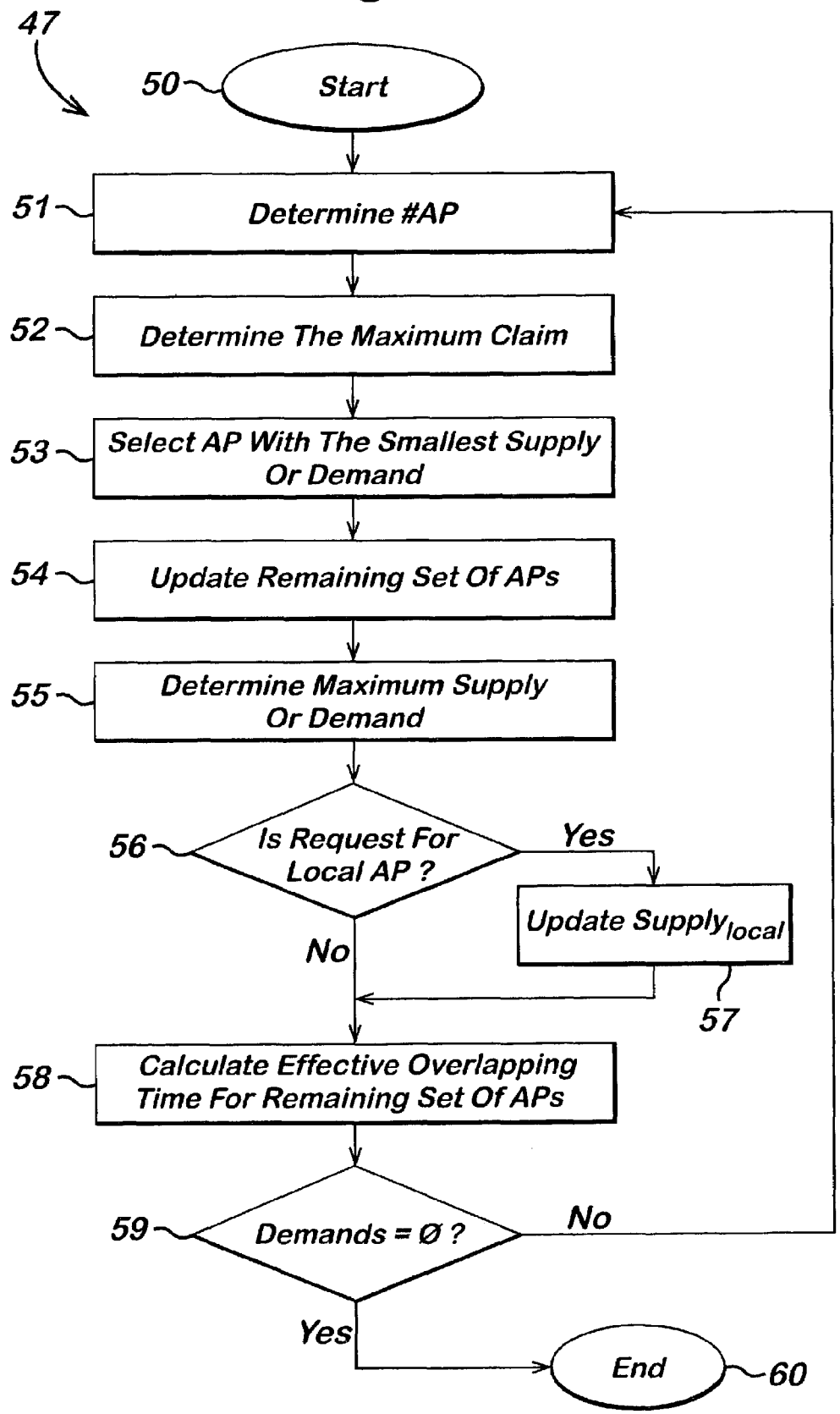
FIG. 4 shows a flow diagram of a subroutine of the mechanism of FIG. 3.

FIG. 4 shows a flow diagram of step 47 in more detail. The procedure starts with a step 50. After this, a step 51 follows in which the number of APs which demand or supply silence, denoted as #AP, is determined using the formula:

Length(Demands), where Length( ) is a function counting the members of a set.

In a next step 52, the maximum claim is by using the formula:

$Claim_{local}:=Tshared_{local}/\#AP$

Since #AP contains both the $AP_{local}$ and its neighbours, this division assures a fair distribution of the supplies and demands over the effective overlapping time. Then, in a step 53, the AP is selected which has the smallest demand of all the overlapping APs. In a step 54, the set Demands is updated by way of removing the demand belonging to the AP determined in the step 53, from the set Demands. Now, in a step 55, the maximum amount of supply or demand is determined, using the formula:

n_max:=Min(n, $Claim_{local}$)

where n is the amount of time corresponding to the demand selected in step 53.

In a step 56, it is tested if the smallest demand is for $AP_{local}$. If the answer of step 56 is 'no', the mechanism follows with a step 58. If however, the answer of step 56 is 'yes', then a step 57 follows in which $Supply_{local}$ is updated using n_max in the formula:

$$Supply_{local} := \underline{AP_{local}[n\underline{n\_max}, X]}$$

where X is the AP corresponding to the demand selected in step 53.

After step 57, a step 58 follows in which the effective overlapping time for the remaining APs is calculated. This is done by using the following formula:

$$Tshared_{local} := Tshared_{local} - n\_max$$

After step 58, it is tested if the set Demands is empty. If this is true, then a step 60 follows in which the procedure of step 47 ends. If Demands is not empty, step 51 is executed again, followed by step 52, etcetera.

It is noted that the description given above is for illustrative purposes only, and is not meant to restrict the present invention in any way.

Figure 5:
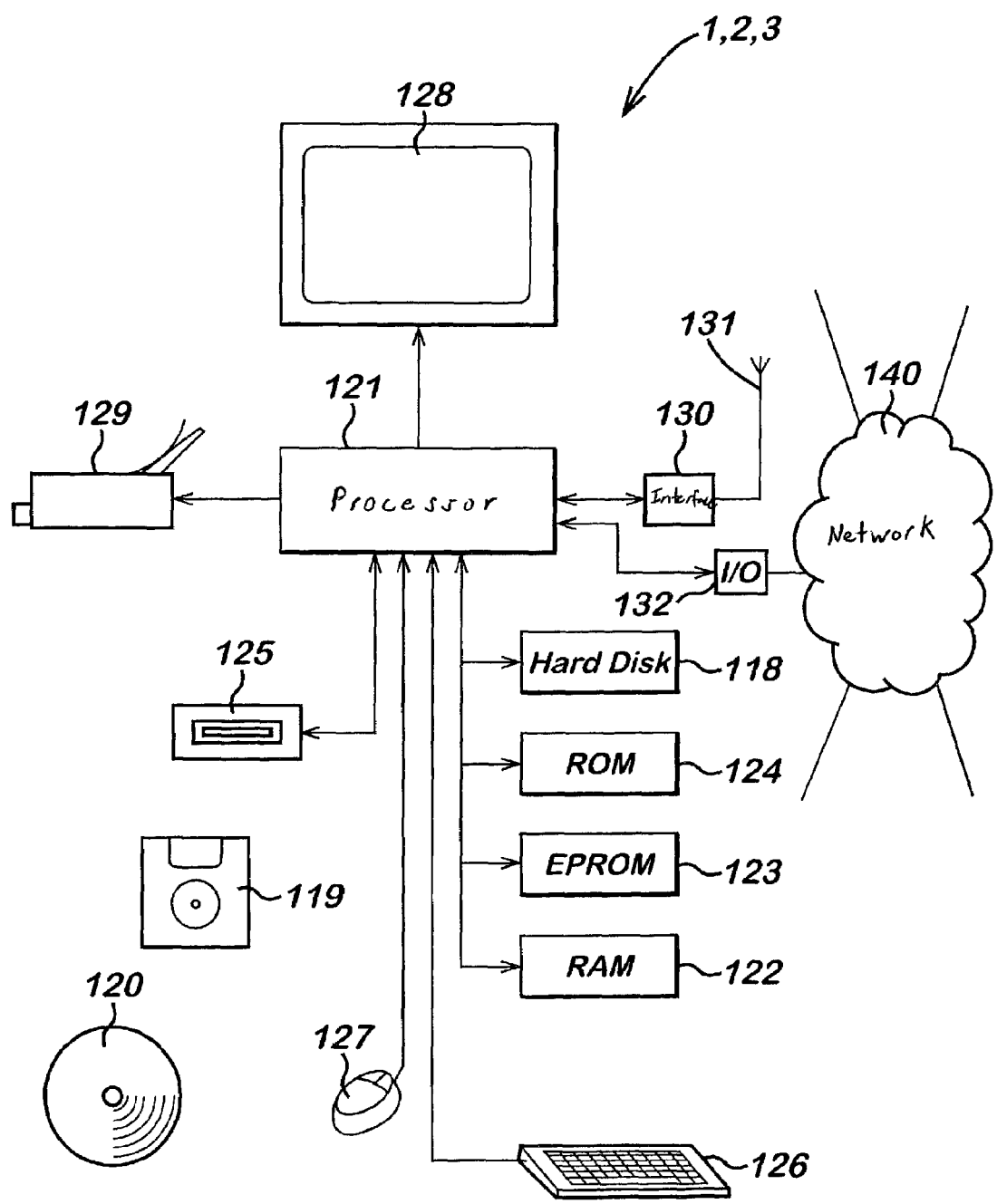
FIG. 5 shows a schematic block diagram of an embodiment of an access point.

FIG. 5 shows a schematic block diagram of an embodiment of an access point 1, 2, 3 of the present invention, comprising processor means 121 with peripherals. The processor means 121 are connected to memory units 118, 122, 123, 124 which store instructions and data, one or more reading units 125 (to read, e.g., floppy disks 119, CD ROM's 120, DVD's, etc.), a keyboard 126 and a mouse 127 as input devices, and as output devices, a monitor 128 and a printer 129. For data-communication over the WLAN 1, an interface card 130 is provided. The interface card 130 connects to an antenna 131. Furthermore, the access point 1, 2, 3 is connected to a wired distribution network 140 through I/O means 132 for communication with, e.g., other access points. The memory units shown comprise RAM 122, (E)EPROM 123, ROM 124 and hard disk 118. However, it should be understood that there may be provided more and/or other memory units known to persons skilled in the art. Moreover, one or more of them may be physically located remote from the processor means 121, if required. The processor means 121 are shown as one box, however, they may comprise several processing units functioning in parallel or controlled by one main processor, that may be located remote from one another, as is known to persons skilled in the art. Moreover, other input/output devices than those shown (i.e. 126, 127, 128, 129) may be provided. In an alternative embodiment of the present invention, the access point 1, 2, 3 may be a telecommunication device in which the components of interface card 130 are incorporated as known to those skilled in the art.

In FIG. 6, an example is shown in which the mechanism is explained in further detail. In the example three APs named A, B and C, are communicating to determine a fair share of silence for avoiding/mitigating overlap. The results of the different steps of FIG. 3 are shown in several columns. The number of the iterations is listed at the left side of the table. An iteration is defined as an execution loop of the subsequent steps 42-47. For each iteration, three rows are shown containing the results for the three APs. Rows 1, 2 and 3 of iteration 1 contain the relevant information for respectively AP A, B and C.

All supplies are set in step 41 to their initial values, so for AP A this means a supply equal to the unknown value of $\underline{A[\infty, \emptyset]}$. The underscore indicates a supply. In this example $Ttol_A=6$, $Ttol_B=4$ and $Ttol_C=3$. This means that AP A has a period of 6 available for resolving overlap etcetera. AP A is demanding silence from AP B for a period of 4, and from AP a period of 2. This is indicated in row 1 of the table in FIG. 6 as B[4,A] and C[2,A]. Both AP B and C are initializing their supply and making their demands, as shown in row 2 and row 3. Now, in step 43 the supplies and demands are exchanged. This means that the content of row 2 and row 3 of the first column is placed in row 1 of the second column of the table. Next, in step 44, the coincident demands are combined. If two overlapping APs request silence from the same AP, then these requests are combined where the demanded silence is set to the longest demand. The demands from other APs to AP A, are represented by A[2,B] and A[2,C]. These two can be combined with the demanded silence set to the maximum equal to Max(2, 2)=2. So, the result of step 44 for the demands to AP A is A[2, BC]. The demands from other APs to AP B, are represented by B[1,C] and B[4,A]. These are combined to B[Max(1, 4), AC]=B[4, AC]. The demands from other APs to AP C, are represented by C[2,B] and C[2,A]. These are combined to C[Max(2, 2), AB]=C[2, AB]. In column 4 of the table in FIG. 6, these demands are listed. Both rows 1, 2 and 3 contain the same demands. In step 45, the effective overlapping time is determined by the different APs For AP A, this means, calculating $Tshared_A := Min(Ttol_A, Max(Ttol_B, Ttol_C)) = Min(6, Max(4, 3))=4$. For AP B and AP C a value of respectively 4 and 3 can be calculated, see row 2 and 3 in column 4 of the table. In step 45 every AP sets its own supply;

for AP A this means $Supply_A := \underline{A[Tshared_A, \emptyset]} = \underline{A[4, \emptyset]}$, for AP B this means $Supply_B := \underline{B[Tshared_B, \emptyset]} = \underline{B[4, \emptyset]}$, and for AP C this means $Supply_C := \underline{C[Tshared_C, \emptyset]} = \underline{C[3, \emptyset]}$.

In step 46 the minimum of the supplies and demands is determined for all demands X[n, S] in the set Demands, using the formula defined above. In this case, the set Demands={A[2, BC], B[4, AC], C[2, AB]}. The set $Supplies_A = \{\underline{B[\infty, \emptyset]}, \underline{C[\infty, \emptyset]}\}$ and the set $Supplies_B = \{\underline{A[\infty, \emptyset]}, \underline{C[\infty, \emptyset]}\}$ and the set $Supplies_C = \{\underline{A[\infty, \emptyset]}, \underline{B[\infty, \emptyset]}\}$.

Now, the minimum of all the supplies and demands is sought because it is not useful to demand more silence from a AP than there is supplied for by that AP. The set of all supplies for AP A is defined as:

$$S_A = (Supplies_A \cup \{Supply_A\}) = \{\underline{B[\infty, \emptyset]}, \underline{C[\infty, \emptyset]}, \underline{A[4, \emptyset]}\}.$$

The set of all supplies for AP B is:

$$S_B = (Supplies_B \cup \{Supply_B\}) = \{\underline{A[\infty, \emptyset]}, \underline{C[\infty, \emptyset]}, \underline{B[4, \emptyset]}\}.$$

The set of all supplies for AP C is:

$$S_C = (Supplies_C \cup \{Supply_C\}) = \{\underline{A[\infty, \emptyset]}, \underline{B[\infty, \emptyset]}, \underline{C[3, \emptyset]}\}.$$

Since there is no communication between the APs A, B and C at this point, AP A only uses the set SA in the calculations. AP A finds the minimum of supplies and demands for AP A by determining the minimum of the following demands/supplies:

Min(A[2, BC], $\underline{B[\infty, \emptyset]}$, $\underline{C[\infty, \emptyset]}$, $\underline{A[4, \emptyset]}$)=2, so the demand is limited to 2 resulting in: A[2, BC].

AP A finds the minimum of supply and demands for AP B by determining the minimum of the following demands/supplies:

Min(B[4, AC], B[∞,Ø], C[∞,Ø], A[4,Ø])=4, so the demand is limited to 4 resulting in: B[4, AC]. AP A finds the minimum of supply and demands for AP C by determining the minimum of the following demands/supplies:

Min(C[2, AB], B[∞,Ø], C[∞,Ø], A[4,Ø])=2, so the demand is limited to 2 resulting in: C[2, AB].

The results of step 46 for AP A are shown in row 1 of the fifth column in FIG. 6.

AP B and AP C also determine the minimal demands for all APs. AP B only uses the set $S_B$ in the calculations, and AP C only uses the set $S_C$ in the calculations. For the sake of convenience only the calculations done by AP C will be discussed. AP C finds the minimum of supplies and demands for AP A by determining the minimum of the following demands/supplies:

Min(A[2,BC], A[∞,Ø], B[∞,Ø], C[3,Ø])=2, so the demand is limited to 2 resulting in: A[2,BC]. This demand is shown in the fifth column of the table in FIG. 6.

AP C finds the minimum of supply and demands for AP B by determining the minimum of the following demands/supplies:

Min(B[4, AC], A[∞,Ø], B[∞,Ø], C[3,Ø])=3, so the demand is limited to 3 resulting in: B[3, AC].

AP C finds the minimum of supply and demands for AP C by determining the minimum of the following demands/supplies:

Min(C[2, AB], A[∞,Ø], B[∞,Ø], C[3,Ø])=2, so the demand is limited to 2 resulting in: C[2, AB].

The results of step 46 for AP C are shown in row 3 of the fifth column in FIG. 6.

In step 47, each AP determines it own supply of silence. The first (sub)step is step 51 in which the AP calculates the number of APs. In this example #AP =3. Then, in step 52, the maximum claim is determined: $Claim_A := Tshared_A/\#AP = 4/3$. In step 53, the AP with the smallest supply or demand has to be selected. This is AP A with the demand A[2, BC], (at this moment AP C could also be picked). This demand is removed from the set Demands in step 54. In step 55, the maximal possible supply or demand is calculated using n_max:=Min(2, 4/3)=4/3. If the request for silence is for the local AP then step 57 will be executed. In this case the demand is A[2, BC] so this is a demand coming from AP A. The local AP is AP A, so this means that step 57 will be executed in which $Supply_{local}$ is set to A[4/3,BC]. In the table of FIG. 6 this is rounded to A[1.3BC], see row 1 of the last column. Next, in step 58, the effective overlapping time for the remaining APs is calculated: $Tshared_A := 4 - 4/3 = 2.6$. In step 5 it is tested if the set Demands is empty. At this moment the set Demands={B[4, AC], C[2, AB]} so the answer is 'no'. This means that step 51 follows. The number of APs is calculated by length(Demands) and this is equal to 2. The steps 52 till 58 will be executed again until the set Demands is empty. Then step 60 will follow, which means that step 47 has ended. The procedure mentioned above, will also be executed by AP B and AP C. The results are shown in the last column of row 2 and 3 in FIG. 6.

After step 47 the procedure of FIG. 3 will continue with step 42. The results for AP A, B and C of the second iteration are shown in respectively row 4, 5 and 6 of FIG. 6. The third iteration is shown in rows 7, 8 and 9. After the third iteration the final results (i.e. the ones in the last column) do not change anymore. This means that the algorithm converges to a stable situation.

Figure 7:
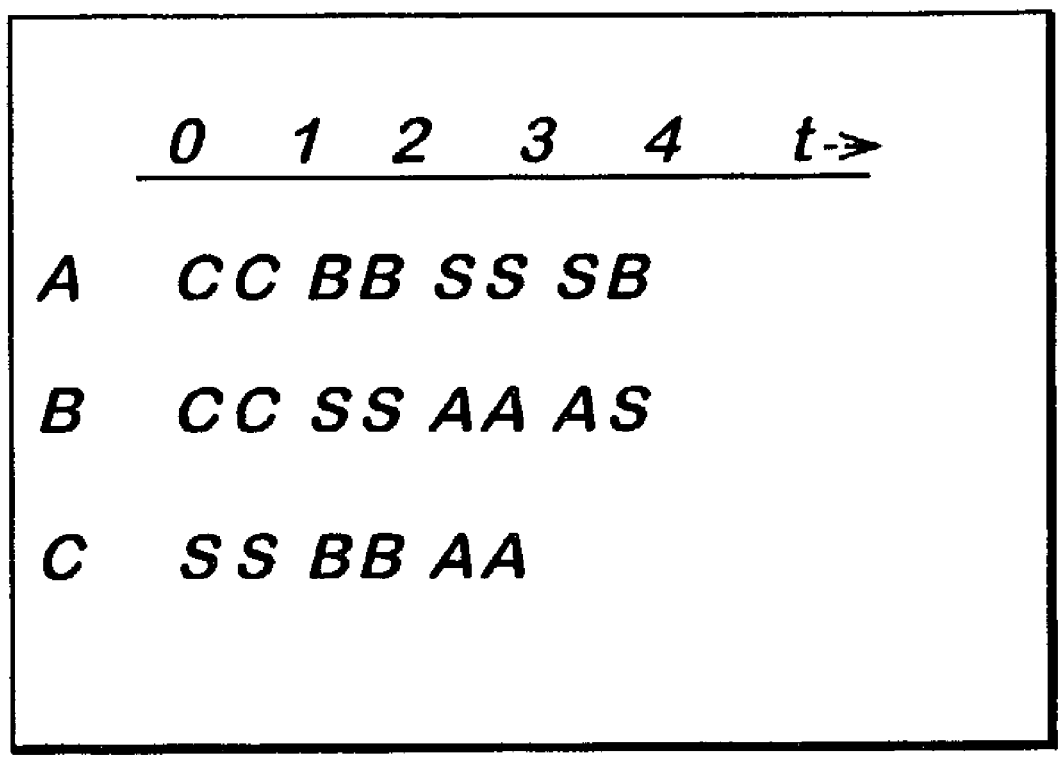
FIG. 7 shows an example of a synchronisation of the silencing periods between three APs.

The final results from the table of FIG. 6 will be used to synchronise the moments of silence between the three APs A, B and C. In FIG. 7 a possible example of such a synchronisation is shown. In FIG. 7 a time period is shown in which APs A, B and C provide silence to oneandother. Between 0 and 1 AP C is silent which is depicted as two characters 'S'. In this period APs A and B are servicing the overlap areas 10, 12 shared with AP C, which is indicated by 'C'. Between 1 and 2 AP B is silent and the other two APs are servicing the overlap areas 11, 12 shared with AP B. Between 2 and 3 AP A is silent and the APs B and C are servicing overlap areas 10, 11. Between 3 and 3.5 AP A is silent and B is servicing overlap area 11 shared with AP A. Between 3.5 and 4 AP B is silent and AP A is servicing overlap area 11 shared with B.

In a preferred embodiment of the invention all APs will continue to calculate the supplies and demands in an infinite loop. The reason for this is that changes might occur concerning the amount of demanded silence.

The invention claimed is:

1. An access point for a wireless local area network, the access point being arranged to service at least one station by using a central medium access control protocol during a time period, and to monitor overlap with neighbouring access points, and to define one or more areas in which at least one first station experiences overlap, as being overlap areas, and one or more areas in which at least one second station does not experience overlap, as being non-overlap areas, and to define one or more neighbouring access points causing the overlap as being overlapping neighbouring access points, the accesspoint comprising:
   a processor device operable such that the access point and the overlapping rieighbouring access points synchronize in such a way that the access point can service the at least one first station in the overlap areas during a servicing time within the time period, while the overlapping neighbouring access points are silent, and vice versa, and
   said device further being operable such that the access point is further arranged to determine the amount of the servicing time by exchanging requests for silence with its overlapping neighbouring access points, wherein said access point is arranged to execute a silence trade-off mechanism which includes:
   (a) initialisation of an own supply for silence;
   (b) determination of a total period of time available for resolving overlap;
   (c) determination of an own demand for silence towards each overlapping neighbouring access point;
   (d) exchanging of an amount of time which is available by the access point for resolving overlap with its neighbouring access points;
   (e) combination of coincident demands using a predetermined combination rule;
   (f) determination of an effective overlapping time according to a predetermined overlap time rule;
   (g) setting the own supply for silence to the effective overlapping time;
   (h) determination of a minimum of demands and supplies for silence according to a minimum determination rule;
   (i) calculation of the own supply of silence;
   (j) repeat the previous steps until a predefined criteria is met.

2. The access point according to claim 1, characterized in that the central medium access control protocol is a Point Coordination Function (PCF) protocol.

3. The access point according to claim 1, characterized in that the calculation of the own supply of silence includes:
   (a) determination of a maximum claim for silence;

(b) selection of a smallest demand for silence, out of a set which constitutes the demands for silence from all overlapping access points;
(c) removing the smallest demand for silence from the set;
(d) determination of a maximum supply/demand time by calculating the minimum of the maximum claim for silence and the amount of time corresponding to the smallest demand for silence from step (b);
(e) updating the own supply for silence if the smallest demand for silence corresponds with the access point;
(f) extract the maximum supply/demand time from the effective overlapping time;
(g) repeat the previous steps until the set is empty.

4. The access point according to claim 1 included in a wireless local area network comprising at least two access points.

5. A method to be performed by an access point for a wireless local area network, the access point being arranged to service at least one station by using a central medium access control protocol during a time period, and to monitor overlap with neighbouring access points, and to define one or more areas in which at least one first stations (4) experiences overlap, as being overlap areas, and one or more areas in which at feast one second station does not experience overlap, as being non-overlap areas, said method comprising the steps of;
defining one or more neighbouring access points causing the overlap as being overlapping neighbouring access points;
the access point and the overlapping neigbouring access points synchronizing in such a way that the access point can service the at least one first station in the overlap areas during a servicing time within the time period, while the overlapping neighbouring access points are silent, and vice versa; and
determining the amount of the servicing time by exchanging requests for silence by the access point with its overlapping neighbouring access points; characterized by;
(a) initialisation of an own supply for silence;
(b) determination of a total period of time available for resolving overlap;
(c) determination of an own demand for silence towards each overlapping neighbouring access point;
(d) exchanging of an amount of time which is available by the access point for resolving overlap with its neighbouring access points;
(e) combination of coincident demands using a predefined combination rule;
(f) determination of an effective overlapping time according to a predefined overlap time rule;
(g) setting the own supply for silence to the effective overlapping time;
(h) determination of a minimum of demands and supplies for silence according to a predefined minimum determination rule;
(i) calculation of the own supply of silence;
(j) repeat the previous steps until a predefined criteria is met.

6. The method according to claim 5, characterized in that the central medium access control protocol is a Point Coordination Function (PCF) protocol.

* * * * *